United States Patent Office 3,370,009
Patented Feb. 20, 1968

3,370,009
HYDROCARBON LUBRICATING OIL OF IMPROVED VISCOSITY INDEX CONTAINING METHACRYLATE GRAFT COPOLYMERS
Abraham Morduchowitz, Spring Valley, and John T. Nolan, Jr., Wappingers Falls, N.Y., assignors to Texaco Inc., New York, N.Y., a corporation of Delaware
No Drawing. Filed Dec. 23, 1965, Ser. No. 516,114
4 Claims. (Cl. 252—56)

This invention relates to the preparation of graft copolymers and in particular to the grafting of a methacrylate polymer onto a backbone chain of a dissimilar methacrylate polymer.

The rate of change of viscosity of lubricating oil with temperature is called the viscosity index or V.I. Oils having a high viscosity index exhibit a smaller change in viscosity with temperature variation than those with a low V.I. In such applications as automobile and aircraft engine lubrications, where a wide range of temperature is encountered, lubricating oils having high viscosity indices are highly desirable and often critically necessary.

It is known that small quantities of long chain polymers of such hydrocarbons as isobutylene and similar aliphatic hydrocarbons, styrene, alkylstyrene, acrylates, methacrylates and esters will substantially increase the V.I. of petroleum lubricants. In particular, homopolymers and copolymers of methacrylic acid esters have been used extensively as "V.I. improvers." These polymeric additives are usually prepared by the free radical polymerization of a monomer or a mixture of monomers. Polymers and copolymers of such esters as butyl methacrylate, hexyl methacrylate, dodecyl methacrylate and octadecyl methacrylate have been prepared by this method. Polymers of the lower alkyl methacrylates are generally good viscosity index improvers but are relatively insoluble in oil; the higher alkyl esters produce polymers which are more oil-soluble but are generally inferior V.I. improvers. A copolymer of a lower alkyl methacrylate and a higher alkyl methacrylate will combine the desirable properties of its constituents, one portion providing the necessary oil solubility and the other contributing V.I. improvement to the oil. Copolymers with these dual properties are utilized extensively as V.I. improvers in lubricating oil.

Attempts to prepare copolymer compositions of such lower alkyl or cycloalkyl methacrylates as isopropyl methacrylate or cyclohexyl methacrylate with dodecyl methacrylate, one of the higher alkyl esters, for use as oil additives have been extremely difficult. Bulk polymerization invariably results in gel formation. The copolymers prepared by free radical polymerization in dilute solution become extensively cross-linked while purifying the isolated solid polymer with chloroform.

It is thought that the structure of these lower molecular weight esters may contribute to the cross-linking. Specifically, both cyclohexyl methacrylate and isopropyl methacrylate contain a labile hydrogen atom attached to a secondary carbon atom which is alpha to an oxygen atom. This structure is susceptible to hydroperoxide formation which upon heating decomposes to a free radical and initiates the cross-linking.

An object of this invention is to copolymerize methacrylates without significant cross-linking.

Another object is to copolymerize a methacrylate susceptible to hydroperoxide formation with a dissimilar methacrylate.

A still further object is to prepare a methacrylate copolymer which is substantially petroleum oil-soluble and which exhibits a significant viscosity index improvement when added to petroleum lubricating oil.

We have discovered that these objects can be achieved by preparing a graft copolymer of a higher molecular weight methacrylate and a lower molecular weight methacrylate containing a labile hydrogen atom attached to a secondary carbon atom located alpha to an oxygen atom. By lower molecular weight methacrylates, we means those whose alcohol portion contains 3 to 8 carbon atoms while by higher molecular weight methacrylates we mean those whose alcohol portion contains 10 to 18 carbon atoms. Alternatively, a higher molecular weight methacrylate containing a labile hydrogen may be copolymerized with a lower molecular weight methacrylate. The tendency of particular methacrylates to form hydroperoxides which may produce undesirable cross-linking is utilized to prepare these graft copolymers. Briefly, a methacrylate susceptible to hydroperoxide formation is homopolymerized to form the backbone or trunk chain. This polymer is then oxidized to the hydroperoxide and the second methacrylate is added. The temperature is increased causing the hydroperoxide to decompose and initiate the polymerization of the second monomer at the hydroperoxide sites.

The graft copolymers produced in accordance with this invention are useful, for example, as viscosity index improvers in petroleum oil compositions.

Broadly, our invention involves grafting an alkyl methacrylate polymer onto a backbone chain of a dissimilar methacrylate polymer which is susceptible to hydroperoxide formation. This backbone chain is a polymer of a first ester having the general formula:

$$CH_2=C(CH_3)-C(=O)-O-Y$$

wherein Y is a member selected from the group consisting of:

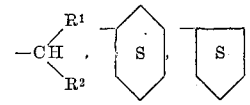

and

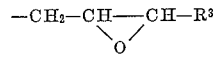

wherein $R^1$ and $R^2$ are the same or different $C_1$–$C_{16}$ alkyl groups and $R^3$ is hydrogen or a $C_1$–$C_{15}$ alkyl group. This homopolymer may be prepared by any of the methods well known in the art. One particularly useful method, disclosed in U.S. Patent 2,471,959, is the free radical polymerization of a solution of the monomer in an inert hydrocarbon solvent, for example, benzene, in the presence of an initiator such as azobisisobutyronitrile. The polymerization is conducted in an inert atmosphere. When the polymerization is completed air is bubbled through the polymer solution until a substantial quantity of the polymer units has been oxidized to hydroperoxides. Solution temperatures of between 50 and 70° C. and preferably between 55 and 65° C. are maintained during the oxidation. Between five and six hours are usually sufficient to achieve the desirable degree of hydroperoxide formation.

The grafting of another polymer onto the backbone polymer takes place at the hydroperoxide site through the mechanism of a free radical polymerization. The polymer hydroperoxide thus provides not only the sites for the graft polymerization but also the free radicals necessary to initiate the polymerization of the second monomer. Therefore, after the hydroperoxide formation step, the air flow is terminated and an inert gas purge, such as nitrogen, is started and continued until any dissolved oxygen is removed. The second ester monomer, optionally and preferably dissolved in an inert hydrocarbon solvent, such as benzene, is added to the polymer solution either before or after the inert gas purge is commenced.

The second ester is a methacrylate monomer having the general formula:

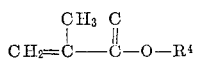

wherein $R^4$ is $C_3$–$C_{18}$ alkyl group. In addition, the sum of the carbon atoms in the Y and $R^4$ groups of the first and second esters are not less than 13 nor more than 26.

To initiate the apparently simultaneous grafting and polymerization of the second monomer, the reaction mixture is heated to decompose the hydroperoxide sites in the polymer. This is easily accomplished by refluxing to maintain a solution temperature of between 75 and 85° C., and preferably between 78 and 82° C. This gentle heating is continued until the graft polymerization is completed as indicated by the constancy of some easily measurable physical property, for example, refractive index. The product polymer is finally purified and recovered as a solid by any of the purification methods well known in the art. For example, the inert solvent may be removed by vacuum distillation and the impure graft polymer washed with acetone, dissolved in chloroform and purified by precipitation from an acetone-methanol solution. Identification of the polymer as a graft copolymer of the first and second ester monomers may be made by vapor phase chromatography.

Among the lower molecular weight methacrylates which may be utilized as the first ester monomer are a first group which are the methacrylate esters of $C_3$–$C_8$ alkyl secondary alcohols, for example, isopropanol, 2-butanol, 2-pentanol, 3-pentanol, 2-hexanol, 3-hexanol, 2-heptanol, 3-heptanol, 4-heptanol, 2-octanol, 3-octanol and 4-octanol. The second group of useful lower molecular weight monomers are the methacrylate esters of cycloalkyl secondary alcohols, for example, cyclopentanol and cyclohexanol. A third group are the methacrylate esters of the epoxy alcohols containing three to eight carbons, for example, 2,3-epoxy-1-propanol, and 2,3-epoxy-2-ethyl-1-hexanol.

The heavier alkyl methacrylates which are usefully employed in conjunction with the lower molecular weight methacrylates include methacrylate esters of such $C_{10}$–$C_{18}$ primary alcohols as isodecanol, 1-decanol, 1-undecanol, 1-dodecanol, 1-tridecanol, 1-tetradecanol, 1-pentadecanol, 1-hexadecanol, 1-heptadecanol, 1-octadecanol and isomers thereof.

All of the methacrylates whose polymers serve as the backbone chain have one structural feature which makes them susceptible to hydroperoxide formation, each contains a hydrogen atom attached to a secondary carbon atom which is in alpha position to an oxygen atom.

Alternatively, a polymer of a $C_{10}$–$C_{18}$ alkyl methacrylate may serve as the backbone chain although the availability of the secondary alcohols necessary to prepare esters which are oxidizable to hydroperoxides may limit the choice. Examples of useful monomers include the methacrylates of such secondary alcohols as 2-decanol, 2-undecanol, 2-dodecanol, 2-tridecanol, 2-tetradecanol, 2-pentadecanol, 2-hexadecanol, 2-heptadecanol and 2-octadecanol. To maintain the preferred sum of carbon atoms in the Y and $R^4$ groups when these heavier esters are employed as the source of the backbone chain, the second ester is selected from the methacrylate esters of such primary alcohols as 1-propanol, 1-butanol, 1-pentanol, 1-hexanol, 1-heptanol, 1-octanol and isomers thereof.

The extent of grafting achieved is directly dependent on the extent of hydroperoxide formation. One skilled in the art can prepare the desired graft copolymer by adjusting the time of oxidation and grafting the monomer onto the polymer until a constant refractive index is attained.

Since these graft copolymers find particular use as petroleum oil additives, it would be desirable to use the petroleum base stock as the solvent for both the initial polymerization and the graft polymerization. This is not possible when the lower molecular weight methacrylates serve as the backbone chain as these polymers are generally insoluble in lubricant base oils. Another solvent, such as benzene, must be employed, with the solvent replaced by the petroleum oil after formation of the graft copolymer. On the other hand, backbone polymers prepared from the esters of the heavier secondary alkyl alcohols are normally oil soluble and where this is so, both the initial polymerization and the graft polymerization may be carried out with the eventual petroleum base oil serving as a solvent.

Suggested mechanisms involved in this graft polymerization are set forth below. Isopropyl methacrylate is used, for purposes of illustration, as the ester forming the backbone chain. The scope of the invention is not intended to be limited by this example.

The polymer fragment is oxidized to the hydroperoxide and then decomposed by heat to a free radical.

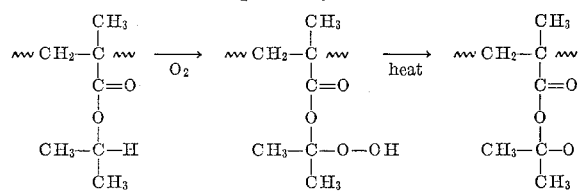

This free radical can then initiate the polymerization of the monomer, M, and cause it to be grafted onto the polymer at the hydroperoxide site. This may occur in one of two ways.

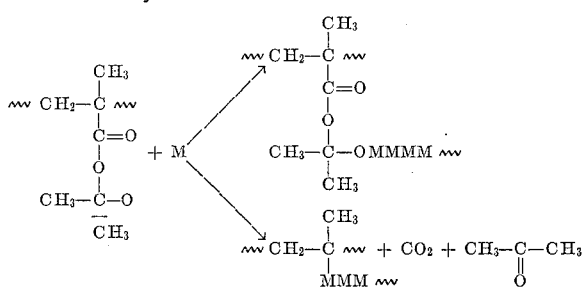

The following examples illustrate how to prepare methacrylate graft copolymers by the method of our invention. The properties of oils containing small amounts of these graft copolymers are also set forth. These examples are merely illustrative and are not intended to limit the scope of our invention.

EXAMPLE 1

This shows that attempts to prepare and isolate a copolymer of octadecyl methacrylate and cyclohexyl methacrylate by means of free radical polymerization are unsuccessful.

In a dry 1 liter three-necked round bottom flask equipped with stirrer, condenser, gas inlet tube and thermometer were placed 126 grams of cyclohexyl methacrylate, 83 grams of octadecyl methacrylate, 250 ml. of benzene and 0.1 gram of azobisisobutyronitrile. The solution was then purged with nitrogen. A nitrogen atmosphere was maintained as the solution was stirred rapidly at 70–75° C. When the refractive index of the medium was found to be constant for two consecutive samplings, the contents of the reaction vessel were poured into a large beaker containing 2 liters of methanol. A gel-like polymer precipitated from the solution. Subsequent attempts to dissolve it in common organic solvents were unsuccessful.

EXAMPLE 2

This shows how poly(octadecyl methacrylate) may be grafted onto poly(cyclohexyl methacrylate).

In a dry 1 liter three-necked round bottom flask equipped with stirrer, condenser, gas inlet tube and thermometer were placed 50 grams of cyclohexyl methacrylate, 500 ml. of benzene and 0.1 gram of azobisisobutyronitrile. The resulting solution was vigorously purged with prepurified nitrogen for ninety minutes. A nitrogen atmosphere was maintained as the solution was refluxed by heating the flask in an oil bath maintained at 90° C. Samples were withdrawn periodically to follow the polymerization by means of refractive index determinations. After refluxing for two hours there was no further increase in refractive index. The solution temperature was then lowered to 55° C. and the nitrogen atmosphere replaced by a vigorous stream of air which was bubbled through the solution for six hours. Additions of 100 grams of octadecyl methacrylate and 150 grams of benzene were then made to the vessel, the flow of air was discontinued and the vessel contents were maintained at 40° C. while purged with prepurified nitrogen for one hour. Following this, the reaction mixture solution was refluxed for about four hours until constant refractive index was achieved. The reaction product was cooled and the polymer isolated by precipitation from two liters of a 1:1 acetone-methanol solution. The precipitated polymer was separated from the supernatant solution, dissolved in refluxing chloroform and further purified by reprecipitation from acetone-methanol solution to yield 79.7 grams of a polymer having an intrinsic viscosity of 0.58 in benzene at 77° F. This product was identified as a graft copolymer of cyclohexyl methacrylate and octadecyl methacrylate since vapor phase chromatographic analysis indicated the presence of cyclohexyl methacrylate and octadecyl methacrylate and solution properties of this polymer differed markedly from that of a mixture of homopolymers of these two methacrylates.

EXAMPLE 3

This shows how poly(octadecyl methacrylate) may be grafted onto poly(isopropyl methacrylate).

The graft copolymer was prepared essentially as that in Example 2. 50 grams of isopropyl methacrylate was polymerized in 500 ml. of benzene at 75° C. with 0.1 gram of azobisisobutyronitrile as an initiator under a nitrogen atmosphere. The homopolymer was then reacted with air, leading to hydroperoxide formation in a manner similar to that of Example 2. 100 grams of octadecyl methacrylate and 150 grams of benzene were then added to the reaction mixture and the resulting solution heated at a reflux for four hours under a nitrogen atmosphere until the polymerization initiated by the hydroperoxide decomposition was completed as indicated by the constancy of a previously increasing refractive index. The benzene solvent was removed by vacuum distillation to yield a fluid rubbery material which was placed in a Soxhlet and extracted with acetone to remove un-reacted octadecyl methacrylate. The extracted polymer was then dissolved in chloroform and purified by precipitation from a 2:1 acetone-methanol solution. The dried polymer had an intrinsic viscosity of 0.84 in benzene at 77° F. It was identified as a graft copolymer of isopropyl methacrylate and octadecyl methacrylate since vapor phase chromatographic analysis indicated the presence of isopropyl methacrylate and octadecyl methacrylate and solution properties of this polymer differed markedly from that of a mixture of homopolymers of these two methacrylates.

EXAMPLE 4

This shows how poly(octadecyl methacrylate) may be grafted onto poly(2,3-epoxy-1-propyl methacrylate).

This graft copolymer was also prepared essentially as was that in Example 2. 60 grams of 2,3-epoxy-1-propyl methacrylate were polymerized in 500 ml. of benzene at 75° C. with 0.1 gram of azobisisobutyronitrile as an initiator under a nitrogen atmosphere. Air was then bubbled through the polymer solution to form the polymer hydroperoxide. 70 grams of octadecyl methacrylate in 150 grams of benzene were added and the mixture was refluxed under a nitrogen atmosphere to initiate the graft polymerization. A constant refractive index of the solution showed when the graft polymerization was completed. The benzene was removed by vacuum distillation and the product was purified by precipitation from chloroform solution with acetone. 39.6 grams of polymer were recovered which had an intrinsic viscosity of 0.51 in benzene at 77° F. It was identified as a graft copolymer of 2,3-epoxy-1-propyl methacrylate and octadecyl methacrylate since vapor phase chromatographic analysis indicated the presence of 2,3-epoxy-1-propyl methacrylate and octadecyl methacrylate and solution properties of this polymer differed markedly from that of a mixture of homopolymers of these two methacrylates.

EXAMPLES 5–13

These examples show that these graft copolymers have utility as viscosity index improvers for petroleum oils. In these examples:

"Polymer A" is the graft copolymer of cyclohexyl methacrylate and octadecyl methacrylate of Example 2, "Polymer B" is the graft copolymer of isopropyl methacrylate and octadecyl methacrylate of Example 3, and "Polymer C" is the graft copolymer of 2,3-epoxy-1-propyl methacrylate and octadecyl methacrylate of Example 4.

| Example No. | Composition | Wt. percent in Blend | Kin. Vis. (cs.) 100° F. | Kin. Vis. (cs.) 210° F. | Viscosity Index | Pour Point ° F. |
|---|---|---|---|---|---|---|
| | Solvent Neutral Oil | | 71.9 | 8.06 | 84 | +5 |
| | plus | | | | | |
| 5 | Polymer A | 0.35 | 78.9 | 9.18 | 100 | −5 |
| 6 | Polymer B | 0.35 | 83.5 | 9.86 | 106 | +5 |
| 7 | Polymer C | 0.35 | 73.0 | 8.60 | 97 | −20 |
| | Motor Oil Composition | | 35.0 | 5.55 | 102 | −0 |
| | plus | | | | | |
| 8 | Polymer A | 1.26 | 51.9 | 8.16 | 130 | −15 |
| 9 | Polymer B | 1.26 | 62.1 | 9.77 | 135 | +5 |
| 10 | Polymer C | 1.26 | 44.4 | 7.07 | 125 | −20 |
| | Transmission Oil Composition | | 26.1 | 4.57 | 96 | −5 |
| | plus | | | | | |
| 11 | Polymer A | 1.58 | 42.4 | 7.41 | 138 | −15 |
| 12 | Polymer B | 1.58 | 52.7 | 9.23 | 143 | +10 |
| 13 | Polymer C | 1.58 | 33.0 | 5.74 | 125 | −45 |

Obviously, many modifications and variations of the invention as hereinbefore set forth may be made without departing from the spirit and scope thereof. Therefore only such limitations should be imposed as are indicated in the appended claims.

We claim:

1. A lubricating composition comprising a major portion of a hydrocarbon lubricating oil and a minor portion sufficient to improve the viscosity index of said oil of a graft copolymer prepared by oxidizing a homopolymer of a first ester monomer to the corresponding hydroperoxide, said first monomer having the general formula:

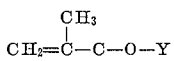

wherein Y is a member selected from the group consisting of

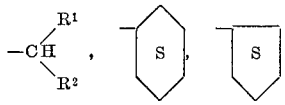

and

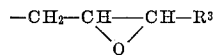

wherein $R^1$ and $R^2$ are the same or different $C_1$–$C_{16}$ alkyl groups and $R^3$ is hydrogen or a $C_1$–$C_{15}$ alkyl group and reacting said hydroperoxide with a second ester monomer having the general formula:

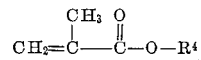

wherein $R^4$ is a $C_3$–$C_{18}$ alkyl group and wherein the sum of the carbon atoms in Y and $R^4$ is not less than 13 nor more than 26.

2. A lubricating composition according to claim 1 wherein Y is cyclohexyl and $R^4$ is octadecyl.

3. A lubricating composition according to claim 1 wherein Y is isopropyl and $R^4$ is octadecyl.

4. A lubricating composition according to claim 1 wherein Y is 2,3-epoxy-1-propyl and $R^4$ is octadecyl.

References Cited

UNITED STATES PATENTS

| | | | |
|---|---|---|---|
| 2,604,453 | 7/1952 | Popkin | 252—56 |
| 2,926,126 | 2/1960 | Graham et al. | 260—885 X |
| 3,069,380 | 12/1962 | Nozaki | 252—56 X |
| 3,087,875 | 4/1963 | Graham et al. | 260—885 X |

DANIEL E. WYMAN, *Primary Examiner.*

W. H. CANNNON, *Assistant Examiner.*

UNITED STATES PATENT OFFICE
CERTIFICATE OF CORRECTION

Patent No. 3,370,009                  February 20, 1968

Abraham Morduchowitz et al.

It is hereby certified that error appears in the above numbered patent requiring correction and that the said Letters Patent should read as corrected below.

Column 2, line 5, "means" should read -- mean --. Column 3, lines 5 to 7, the formula should appear as shown below:

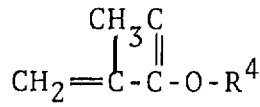

Column 4, lines 35 to 43, the formula should appear as shown below:

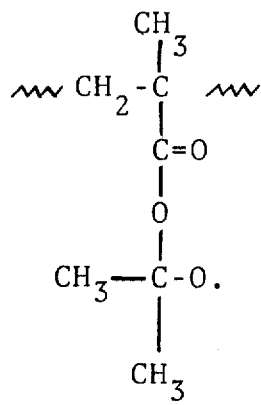

Signed and sealed this 9th day of September 1969.

(SEAL)
Attest:

EDWARD M.FLETCHER,JR.            WILLIAM E. SCHUYLER, JR.
Attesting Officer                  Commissioner of Patents